(12) United States Patent
Batista

(10) Patent No.: US 12,371,100 B2
(45) Date of Patent: Jul. 29, 2025

(54) THREE-DIMENSIONAL MONITORING SYSTEM FOR KINGPIN ON FIFTH WHEEL

(71) Applicant: Igor Batista, Belo Horizonte (BR)

(72) Inventor: Igor Batista, Belo Horizonte (BR)

( * ) Notice: Subject to any disclaimer, the term of this patent is extended or adjusted under 35 U.S.C. 154(b) by 874 days.

(21) Appl. No.: 17/618,279

(22) PCT Filed: Jun. 11, 2020

(86) PCT No.: PCT/BR2020/050208
§ 371 (c)(1),
(2) Date: Dec. 10, 2021

(87) PCT Pub. No.: WO2020/248035
PCT Pub. Date: Dec. 17, 2020

(65) Prior Publication Data
US 2022/0306196 A1 Sep. 29, 2022

(30) Foreign Application Priority Data

Jun. 11, 2019 (BR) .......................... 102019011868-7
Jul. 12, 2019 (BR) .......................... 102019014517-0

(51) Int. Cl.
*B62D 15/02* (2006.01)
*B62D 53/08* (2006.01)

(52) U.S. Cl.
CPC ....... *B62D 15/023* (2013.01); *B62D 53/0842* (2013.01)

(58) Field of Classification Search
CPC .......................... B62D 15/023; B62D 53/0842
(Continued)

(56) References Cited

U.S. PATENT DOCUMENTS 5,152,544 A 10/1992 Dierker, Jr. et al.
5,511,812 A 4/1996 Milner
(Continued)

FOREIGN PATENT DOCUMENTS

DE 19964045 A1 * 7/2001 ............ B62D 15/02
DE 102017110520 A1 * 11/2018
(Continued)

OTHER PUBLICATIONS

International Search Report and Written Opinion for PCT/BR2020/050208, mailed Oct. 9, 2020.

*Primary Examiner* — Jacob D Knutson
(74) *Attorney, Agent, or Firm* — Renner, Otto, Boisselle & Sklar, LLP

(57) ABSTRACT

"THREE-DIMENSIONAL MONITORING SYSTEM FOR KINGPIN ON FIFTH WHEEL" describes an invention patent, for a monitoring system of Kingpin/Fifth Wheel articulation presented on trucks, with a great applicability for autonomous steering systems and vehicle dynamics control. This system allows the precise monitoring of translational, rotational movements and the relative accelerations of the king pin (5) in relation to the fifth wheel (3) on the X, Y and Z axes, totaling measurements in six degrees of freedom. The present patent presents two ways to make this monitoring of the three-dimensional position of the kingpin (5): The first through a set of sensors (6) accelerometers and gyroscope integrated to an electromagnet (4) that when electrified, is coupled to the king pin (5) by magnetic attraction. The second mode through a reference device (20) that is magnetic, identifiable, independent and easy to apply to the kingpin (4).

8 Claims, 5 Drawing Sheets

(58) Field of Classification Search
USPC .......................................................... 280/433
See application file for complete search history.

(56) References Cited

U.S. PATENT DOCUMENTS

| 11,794,705 | B2 * | 10/2023 | Sielhorst ................. B60D 1/62 |
| 2019/0118876 | A1 | 4/2019 | Schutt et al. |
| 2020/0292353 | A1 | 9/2020 | Sielhorst et al. |
| 2021/0171100 | A1 | 6/2021 | Wulf et al. |

FOREIGN PATENT DOCUMENTS

| EP | 1106486 | A2 | | 6/2001 | |
| EP | 2849991 | B1 | | 12/2016 | |
| GB | 2310340 | A | * | 8/1997 | ............. B62D 53/08 |
| WO | 2007050019 | A1 | | 5/2007 | |
| WO | 2019210133 | A1 | | 10/2019 | |
| WO | 2019231903 | A1 | | 12/2019 | |
| WO | 2019243025 | A1 | | 12/2019 | |
| WO | 2019101847 | A1 | | 5/2020 | |

* cited by examiner

THREE-DIMENSIONAL MONITORING SYSTEM FOR KINGPIN ON FIFTH WHEEL

The present invention patent refers to a system for Kingpin/Fifth Wheel articulations, used in large trucks. These systems will monitoring the relative movements of translation, rotation and accelerations of the king pin when it is hitched in a fifth wheel on the X, Y and Z axes. The difference between these systems is that there is no need for electronics installed on the kingpin and the trailer. This monitoring of movements of the king pin can be performed by a set of sensors composed of accelerometers and gyroscopes, integrated to an electromagnet that is coupled to the king pin when the fifth wheel is engaged or by a king pin with magnetic device.

In view of a scenario where large cargo vehicles fleet is increasing, at the same time their large dimensions and weight demand an ever-increasing level of safety and automation. Because this, monitoring sensors for dynamics vehicle become extremely relevant for these applications.

The automotive industry in this segment has been constantly seeking technological solutions to provide a higher level of safety and automation for these vehicles, such as electronic braking systems (EBS), antirollover (RSC) and stability control systems (ESC). Although these systems have a considerable efficiency and reliability to avoid accidents, however, they are still unable to measure yaw movements of the semi-trailer. However, there are some systems for combined monitoring of the truck and trailer, but it is essentially that all vehicles of the composition have sensors, embedded electronics and an efficient communication between them, to allow the complete control of the vehicle composition dynamics. It is recurrent that, one of the vehicles does not have sensors for monitoring, due the technological lag or no communication interface between the sensors of the trailer and the truck. Since there is no communication or no electronics in the trailer, the vehicle dynamic control is impossible.

The present invention comes to meet these needs in a simple, practical, precise and affordable way. The three-dimensional monitoring technology in kingpin allows the sensor to engage and disengage to the kingpin of the trailer at each hitch, without the need for any type of electronics installed on the semi-trailer to allow the control of its vehicle dynamics. In this way, it allows to control even in technologically outdated semitrailers, without any type of embedded electronics.

In addition to this essential measurement of the articulation angle between vehicles, the present system allows the complete verification of the movement and accelerations of the kingpin in relation to the fifth wheel, in 6 degrees of freedom: translational displacements and rotations on the X, Y and Z axes. From these measurements, the main needs of the automotive sector are:

The verification of the displacement of the kingpin in the X axes (direction of the vehicle travel) and in the Y axis (lateral direction of the vehicle) allows the check of the existence of clearances in the articulation;

The verification of the displacement and acceleration of the king pin on the Z axis (direction of the vehicle height), allows to detect situations of imminent rollover, through the sudden displacement of the king pin on this axis;

Finally, the combined verification of displacements of the king pin, on the X and Y axes (XY plane) is possible to measure the rotation of the pin on the Z axis, allowing to verify the articulation angle between the vehicles in conversions.

In view of these needs, it is essential that this system claimed, in addition to its features presented, has versatility, reliability, robustness and precision. The system of the present patent can be applied without need of structural modifications to the king pin or the fifth wheel, being possible its application even in vehicles already in circulation. In addition to its easy applicability, the system is resistant to grease, abrasives, very present in the vehicle's articulation environment.

In a first proposal of the system now claimed, the use of an electromagnet to couple to the king pin, allows the constant coupling/disengagement of vehicles without damaging the sensor, in addition to allowing the dynamic monitoring of any trailer coupled to the fifth wheel, regardless of the technological level of this vehicle, showing a universal system, with high industrial applicability to all articulation king pin/fifth wheel.

In the second system proposal, the use a kingpin magnetic referential device, with high applicability to tracking systems and vehicles already in circulation, presenting high efficiency and precision.

STATE OF THE ART

In a wide analysis of the current state of the art, aim to verify technologies similar to the present system claimed, about this can mention some patent applications that also aim to monitor some movements of the king pin coupled in fifth wheel:

U.S. Pat. No. 5,152,544A patent, "Articulation angle sensor": Explains a system for sensing the angular reading the kingpin rotating axis in relation to the fifth wheel. This process claims: A magnetic element present, positioned and transported by the truck, which is coupled to the king pin, this is "protected" by a housing that limits the movement of this magnet only for rotation movement; A magnetometer sensor present, positioned, also transported by the truck and "protected" by the same housing of the magnetic element. The magnetic element rests on this sensor while the vehicle is disengaged. This system has characteristics and technical elements that, in fact, its construction and concepts factors limit it due to the dynamics of the vehicles and, consequently does not allow the reading more degrees of freedom beyond the rotation angle of the kingpin. The magnetic element is attached to the king pin at the moment of engagement by simple magnetic attraction, as shown in the patent. For this reason, it is technically impossible to guarantee the coupling of the magnet with eccentricity to the central point of the kingpin at all times when the vehicle is engaged, thus this, of course generating sensor reading errors. This system has a relevant limitation, where it would not be possible to disengage the semi-trailer, since this magnet element is coupled to the king pin by constant magnetic attraction. Another point is the fact that there is a housing for the protection of the elements of the system and it is fixed on the truck, which mechanically limits only for the magnet rotates and reads only the turning angle of the king pin, making it impossible to reading others degrees of freedom. This configuration of both the sensor and the magnetic element being positioned on the truck and not on the fifth wheel structure, can generate mechanical damage or reading errors, since there are significant relative movements between the truck and its fifth wheel. Due to this configuration, there is also the possibility of improper angle readings with the vehicle disengaged about some vibrations of the magnetic element that is resting on top of the sensor. Finally, it is possible to conclude that this state of the art differs from the system claimed here mainly because: the measurement is made only by a magnetometer present on the tractor vehicle and not in the fifth wheel; it detects the movement by a permanent magnet which moves in solidarity to the kingpin; and finally, due to its technical and mechanical limitations, this system monitor only one degree of freedom—the angle rotation between the king pin and the fifth wheel.

The patent DE19964045A1 also features a system for angular measurement for king pin/fifth wheel articulation of an electromagnet device. This claims a solution in which the magnet induces a magnetic field and it is detected by magnetic sensors present in the truck. This application also differs from the state of the art now claimed, since a permanent magnet is used to induce a magnetic field that is mechanically placed on the king pin at each engagement. The sensor is present in the fifth wheel and is of the hall type, which allows only to monitor the magnetic field in only one degree of freedom. Like the process mentioned above, the system does not specify how the permanent magnet will be removed from the kingpin during decoupling, since it will be constantly attracted. Another point is that this patent has a mechanical device to attach the magnet to the king pin, which may not guarantee repeatability of the coupling position. However, the system has a hall effect sensor to perform the reading, this type of sensor basically makes an analog reading of the magnetic field variation, different of the magnetometer that allows to verify the X, Y and Z position of a magnetic field, therefore, also limited to just checking the rotation of the kingpin and not its three-dimensional position.

Finally, EP 2849991 B1 is presented, a system also exclusively for angular measurement through a magnetic marker (magnet or electromagnet) present on the king pin and a sensor mounted on a mechanical device that approximates this to the magnetic marker. In this patent, the state of the art claimed is a magnetic marker present exclusively on the central axis of the kingpin and a sensor that needs to be very close to this marker to perform the angular reading. As the sensor needs to be close to measure the angle, a mechanism is also claimed to bring it closer to this magnetic element present in the central of the kingpin. Despite its high precision, this system is ineffective in terms of measure gaps and vibrations between the king pin and the fifth wheel. By the way it can be said that is not technically capable of make measurements of the kingpin on the X and Z axis translations, since in claim number 1 of this document, the author indicates that his sensor is uncapable to read the position of the magnetic marker at higher distances than on the ideal working position of the kingpin, therefore, it limits this system only to read the articulation angle, only if the sensor is very close to this magnetic marker.

The WO2019101847, reveals a fifth wheel sensor with a mechanical device that is claimed that this sensor will monitor only the rotational movement of the kingpin in Z axis (GZ) but is permitted the sensor has small rotational turns on Y and X axes (GY and GX), on these two axes is just mechanically free and is not monitored by the sensor. So, is claimed that this system has three degrees of mechanic freedom (GX, GY and GZ) and only one degree of monitor sensing (GZ). This device also does not present any mechanical solution (and sensing solution) for permit king pin's translational movements, so is not possible to monitor this degree freedom and the king pin's translational accelerations, as is now claimed. This patent also doesn't reveal any automation for magnetic sensor device coupling/decoupling to the king pin, is still made by permanent magnetic attraction.

The present system now claimed reveals high innovative characters with sensors device only present on the fifth wheel, high applicability on the automotive industry, and more practical characteristics and data output than the patents above. The system presents two ways to monitor the three-dimensional movements of the kingpin: A sensor integrated to an electromagnet device and by a magnetometer sensor present on the fifth wheel that monitors the spatial position of a magnetic device present on the king pin head. The technical description, the advantages and applicability can be better understood with the attached figures:

DESCRIPTION OF THE FIGURES

With reference to FIG. 1, for better understanding, the articulated truck and its fifth wheel articulation are presented (3). This consists at least one tractor truck (1) and a semi-trailer (2). This figure also shows the top view of the fifth wheel (3) and the X, Y and Z coordinate system convention for vehicles.

Figure 1:
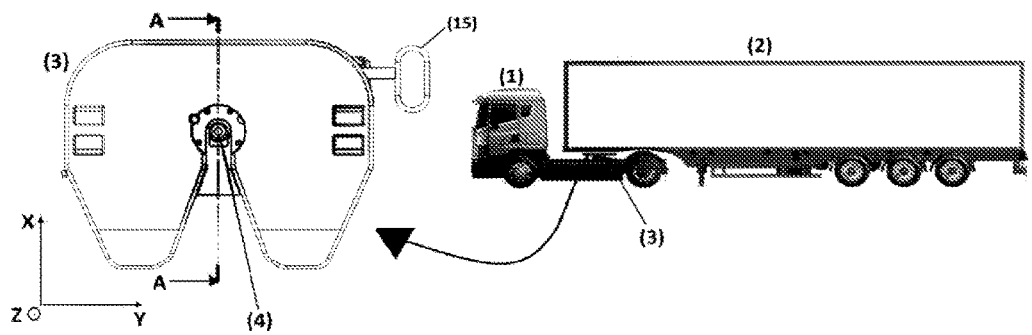
FIG. 1 shows the articulated truck, its fifth wheel (articulation), the cutting plane and the coordinate axes.
Figure 2:
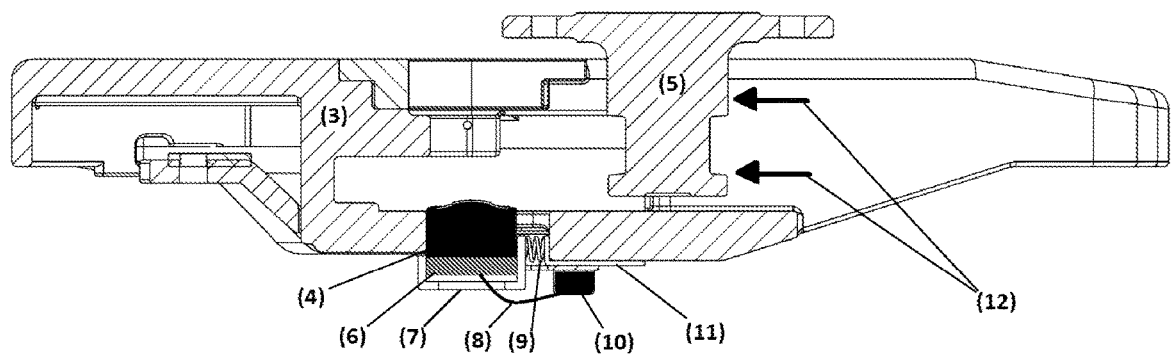
FIG. 2 shows the section view of the fifth wheel before engaging of the kingpin—for the three-dimensional measurement proposal by coupling with an electromagnet.

Description of the Proposal by Electromagnet Device:

FIG. 2 shows the view of the fifth wheel (3) in section AA referenced in FIG. 1 in the condition of disengaged vehicle. In this figure it is possible to verify the components of the three-dimensional measurement proposal, the electromagnet device (4) that will be coupled to the king pin (5) in the sequence, to allow its (5) integral movements and kinematic conditions monitoring: the set of sensors (6) present on the electromagnet device (4) connected to an electronic central (10) by a communicator cable (8). These components are arranged be at the bottom of the fifth wheel (3), mounted on a support (7) connected to a set of springs (9) which is fixed to the fifth wheel (3) by a fixing device (11). Still on the FIG. 2, it presents the king pin (5) on movement, in direction (12) for engagement. At this time, the electromagnet device (4) is on a static and on the lowest position and de-energized.

Figure 3:
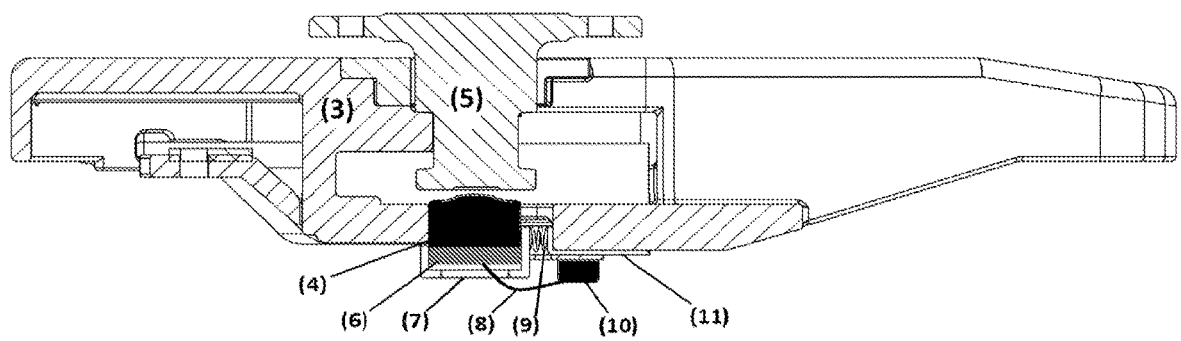
FIG. 3 shows the section view of the fifth wheel with the king pin in the engaged and unlocked position—for the three-dimensional measurement proposal by coupling with an electromagnet.

FIG. 3 it presents the situation that the king pin (5) is in pre-engaged position, where the fifth wheel (3) has not yet been locked yet. In this condition, the electromagnet device (4) will remain in its lowest Z axis position and de-energized, as the same condition in the previous figure in the disengaged position.

Figure 4:
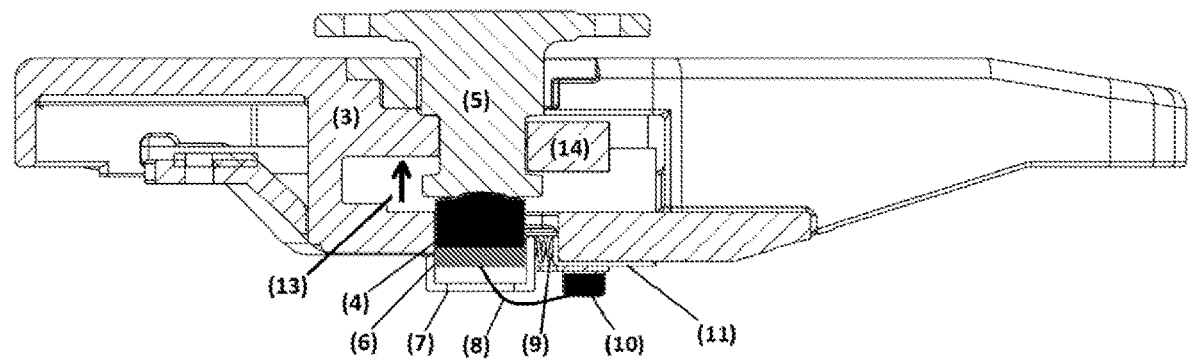
FIG. 4 shows the section view of the fifth wheel with the king pin in the engaged and locked position—for the three-dimensional measurement proposal by coupling with an electromagnet.
Figure 5:
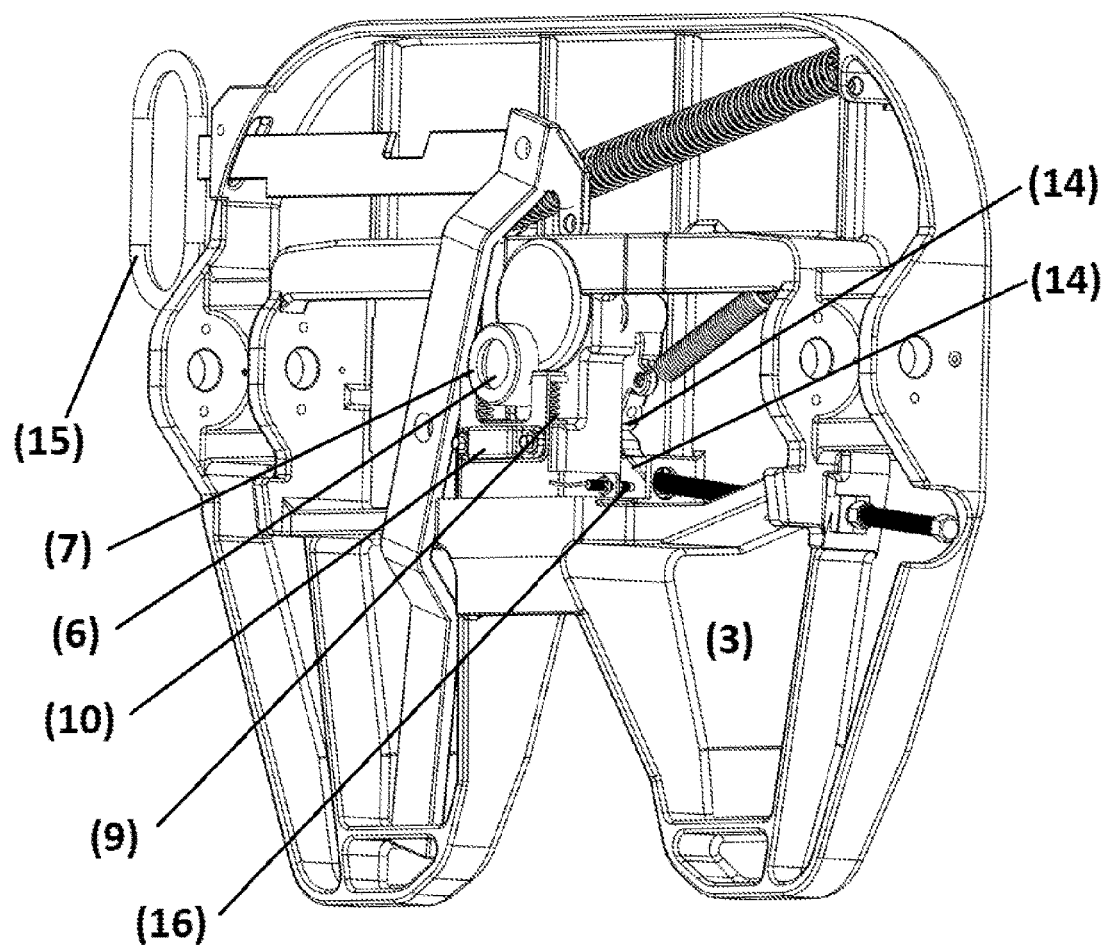
FIG. 5 shows a bottom view of the fifth wheel—for the three-dimensional measurement proposal by coupling with an electromagnet.

FIG. 4 shows a condition immediately after the pre-engagement. In this condition the king pin (5) is locked, through a locking mechanism (14) of the fifth wheel (3). At this moment, the system will detect this locking through a sensor (16) which monitor the position of the locking mechanism (14) (shown in FIG. 5) or by sensors of the presence of the king pin (5) in the fifth wheel (3). Upon detecting this locking condition, the electronic central (10) controls the electrification of the electromagnet device (4). When the central (10) turns on this device (4), it will be magnet attracted (13) for the metallic mass of the kingpin (5) above and will couple magnetically to the pin (5). This electromagnet (4) is in a centralized position in relation to the king pin (5) for ensuring the repeatability of this couple processing.

Figure 6:
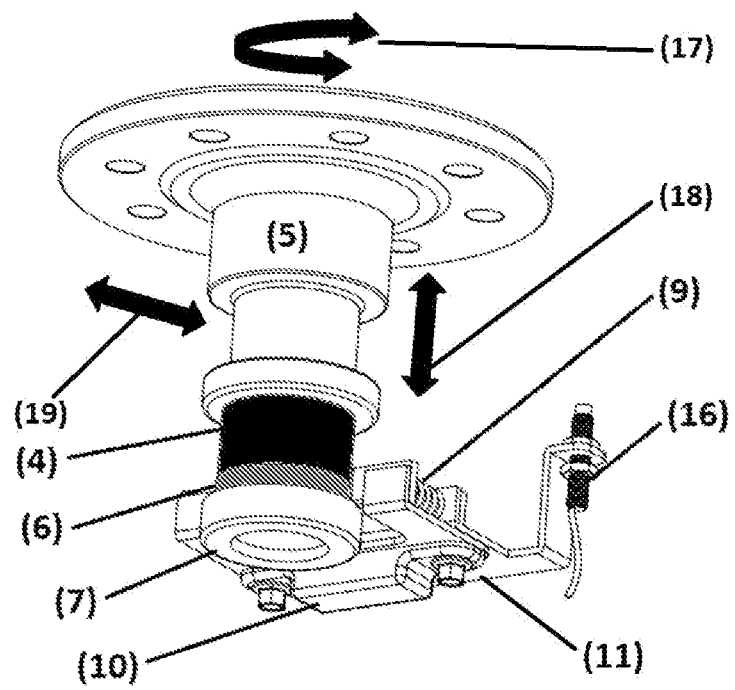
FIG. 6 shows the complete system in coupling condition, with the electromagnet coupled to the king pin and the fifth wheel hidden—for the three-dimensional measurement proposal by coupling with an electromagnet.

FIG. 6 shows the system with the fifth wheel (3) hidden, for a better understanding. In this condition the electromagnet (4) is electrified and coupled to the king pin (5) by magnetic attraction. The electromagnet (4) has a set of sensors (6) integrated in the body, composed of accelerometers and gyroscope, which when is coupled, will fully monitor the movements of the king pin (5). These sensors (6) will also measure translational displacements (18 and 19) and accelerations of the pin (5). If the sensor (6) monitors all rotational, translational and the displacement accelerations (AX, AY and AZ) of the king pin's (5) movements, can be said that will monitor the king pin's (5) kinematic conditions in relation of the fifth wheel (3).

The mainly monitored axes is indicated on FIG. 6:—X axis translation (TX) (19), that indicates the presence of clearances in the longitudinal direction; Z axis translation (TZ) (18) that presents tendencies of vehicle rollover. These sensors (6) also measure the rotation around Z axis (RZ) (17), the relative articulation angle between king pin (5) and fifth wheel (5), through a gyroscope of the set of sensors (6). These movements explained in FIG. 6 are the most relevant for monitoring automotive control systems, but sensors (6) also allow rotations and translations on X and Y axes to be monitored, totaling the measurement king pin's (5) movements on six degrees of freedom (RZ, RX, RY and TZ, TX, TY).

To allow these measurements, the set of electromagnet (4) and sensors (6) needs to work freely for fully monitoring the movements of the king pin (5). The electromagnet (4) is arranged on a support (7) that allows its free mechanical rotation (17) and translation (18) on Z axis. This support (7) is connected to the fixing device (11) of the fifth wheel (3) by a set of springs (9), which allows free mechanical translational and rotational movements on X (19) and Y axes.

On this proposal, the king pin's (5) movement measurements are relative to the fifth wheel (3). For this reason, the electronic central (10) is located on the fifth wheel (3). As the sensor set (6) will move in solidarity with the king pin (5), the readings by these sensors (6) will be in absolute values, these will be compared with the sensor (accelerometers and gyroscopes) present in the electronic central (10) present in the fifth wheel (3), that can also be called the Fifth Wheel Electronical Central (10). Finally, measurements of relative movements and accelerations between the set of sensors (6) and the central (10) will be generated on reference to the movements between the king pin (5) and the fifth wheel (3). Another advantage of the system is that this electronic central (10) serves not only to read the king pin's (5) movements, but also to monitor movements of the fifth wheel (3), even when the vehicle is disengaged.

Finally, to disengage the semi-trailer (2) it is necessary to unlock the fifth wheel (3). This is a usual procedure for truck drivers where simply pull the unlock lever (15). When performing this procedure, the locking mechanism (14) will move to allow the disengagement movement of the king pin (5). At this point, the sensor (16) will detect the movement of the mechanism (14). The fifth wheel electronic central (10) will cut off the electrical supply to the electromagnet device (4) which will disengage from the king pin (5) by gravity, allowing the safe disengagement movement without the electromagnet (4) damages.

In general, according to its functionalities and advantages, this proposal is based on a concept of monitoring the articulation where its components are arranged exclusively present in the fifth wheel (3). This system will perform the integral monitoring of the movements and accelerations of the king pin (5) by an electromagnet device (4) coupled on this pin (5).

Figure 7:
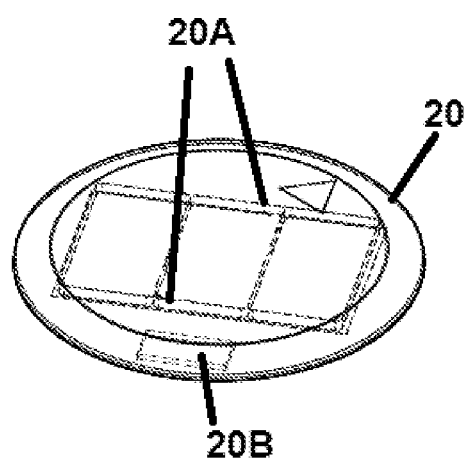
FIG. 7 shows the identifiable magnetic reference disc for king pin.

Description of the Proposal by a Referential Device:

FIG. 7 initially presents the identifiable magnetic reference device (20), essential for this proposal. This reference device (20) is an independent component, fixable and attachable to the king pin (5). Basically, it has a permanent magnet on its body with its north and south poles (20A) and also with a coded tag (20B).

Figure 8:
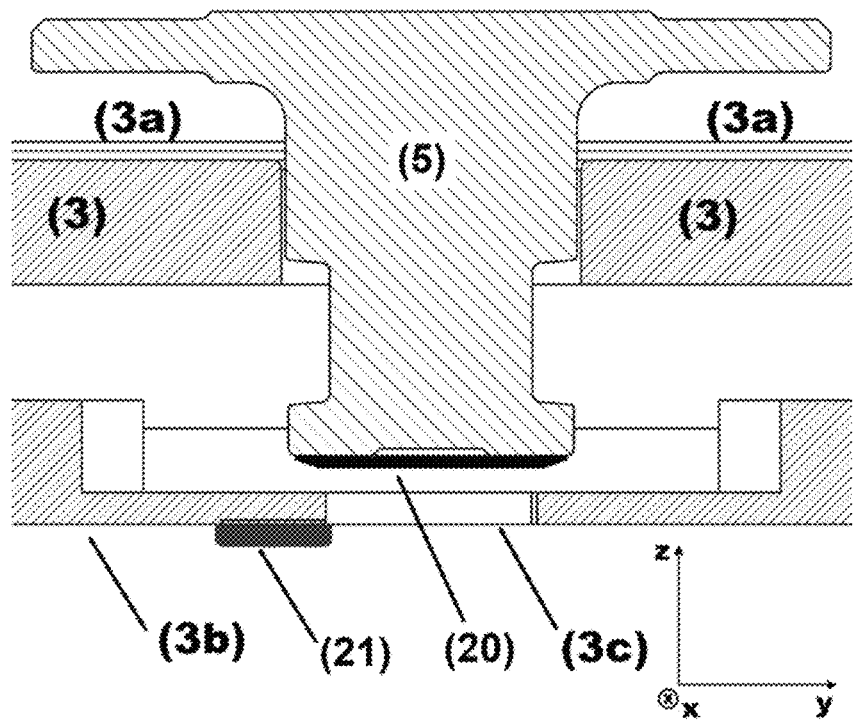
FIG. 8 shows a sectional view of the articulation between the king pin and fifth wheel—for three-dimensional measurement proposal by magnetic disk.

FIG. 8 represents (in section view) the king pin (5) when engaged on the fifth wheel (3) (upper 3A and lower part 3B) seen from the rear position, in ZY plane. This figure also shows the magnetometer sensor center (21) and the identifiable magnetic reference device (20).

Figure 9:
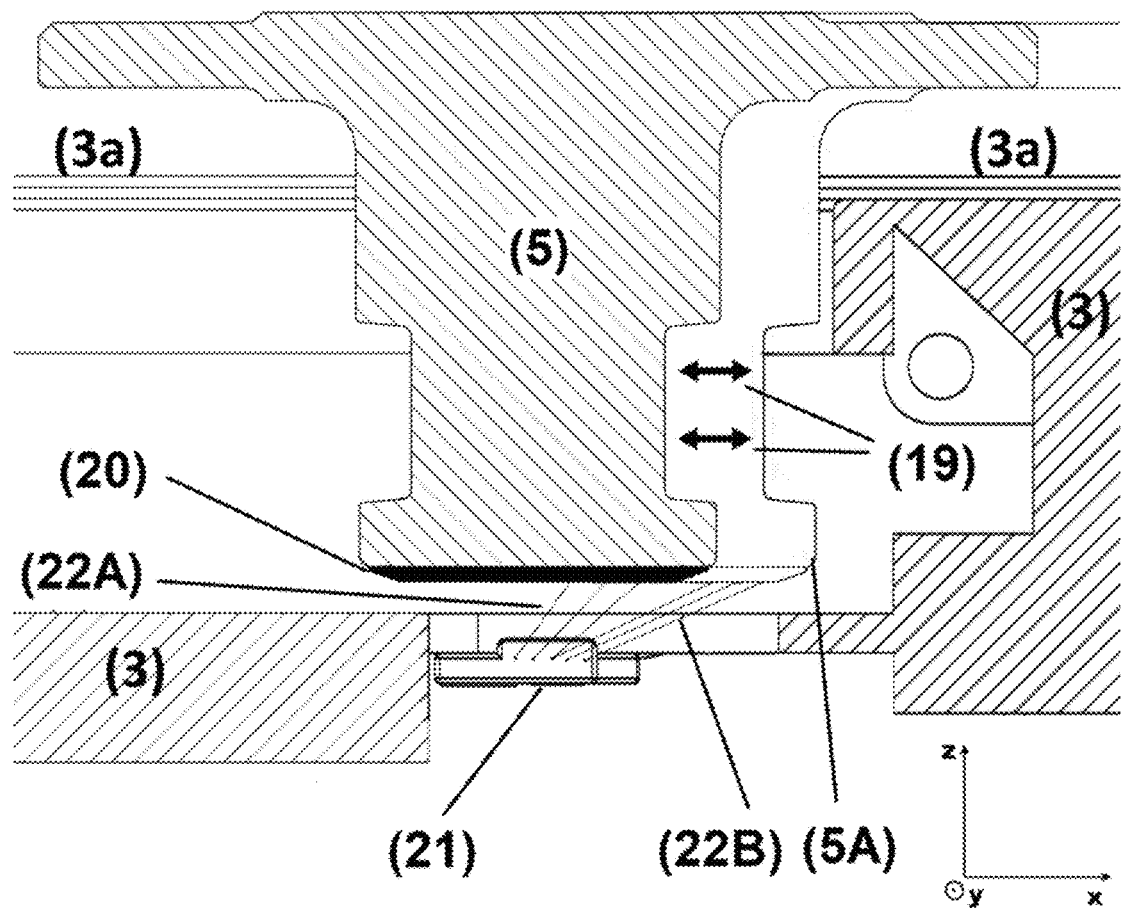
FIG. 9 shows a sectional view of the king pin and fifth wheel joint with clearance on the X axis—for three-dimensional measurement proposal by magnetic disk.

In general, and with reference to FIG. 9, this proposal is based on a magnetometer sensor central (21), fixed at the bottom of the fifth wheel (3*b*), which monitors the three-dimensional position of the magnetic poles (20A) of the reference (20), through the variation of the magnetic field (22A and 22B). Because this device (20) that is attached in the king pin (5), the system is able to monitoring the pin (5) movements on the X (19), Z (18) and Y axes, an example is when there are clearances and the king pin (5) moves from its ideal working position (5A).

Figure 10:
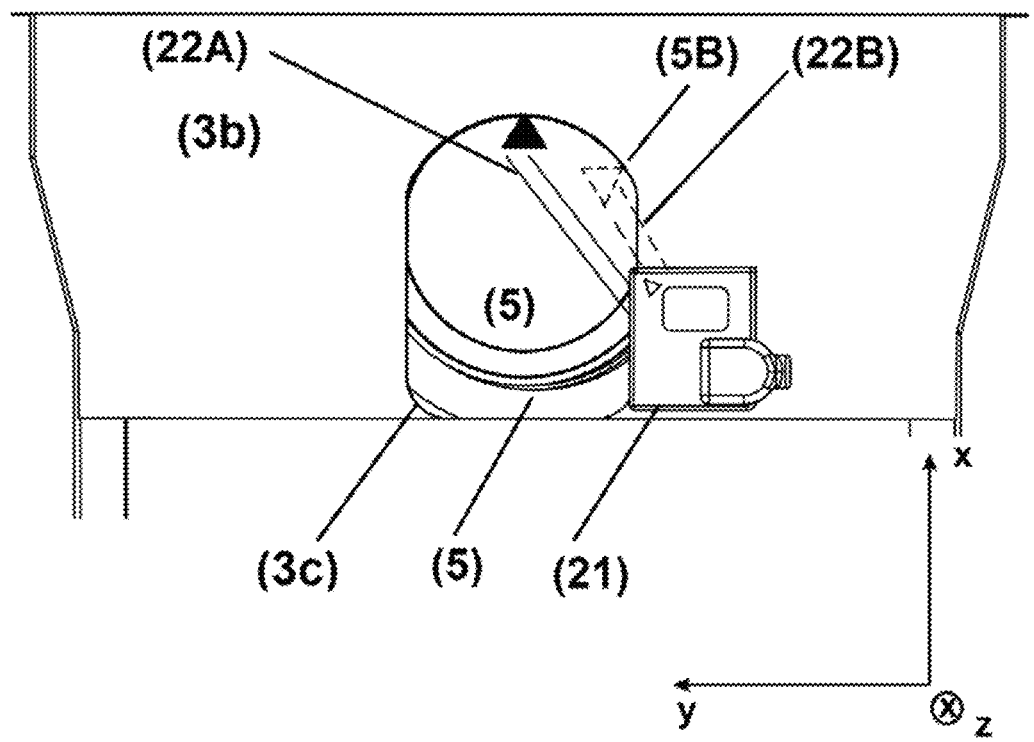
FIG. 10 shows the bottom view, seen below the hole of the fifth wheel, of the proposal—for three-dimensional measurement proposal by magnetic disk.

With reference to FIG. 10, view on the hole of the fifth wheel (3*c*), from the combined variation of the X and Y displacements (TX and TY) of the king pin (5B), it is also possible to measure the relative angle between (RZ) the pin (5) and the fifth wheel (3).

Figure 11:
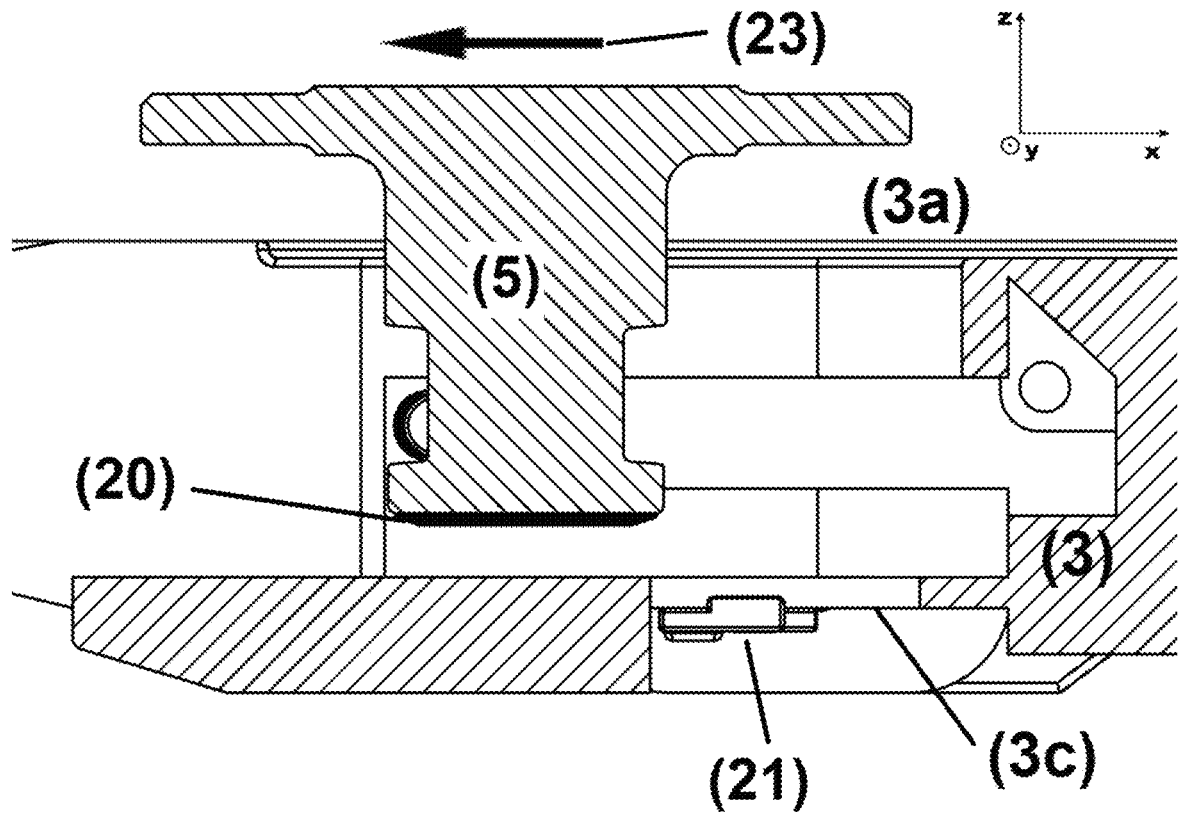
FIG. 11 shows a sectional view of the fifth wheel king pin joint in the vehicle's disengagement situation— for three-dimensional measurement proposal by magnetic disk.

Finally, with reference to FIG. 11, this system propose allows checking the vehicle's engagement/disengagement by varying the intensity of the magnetic field, which is higher engagement and practically zero when disengaged. In the condition of the figure, when the king pin (5) moves in the direction of disengagement (23), a considerable distance from the reference device (20) in relation to the sensor (21), the intensity of the magnetic field will drop sharply.

This proposal has an advantage, this device (20) can be identifiable with the presence of a coded TAG (20B), that can indicate which trailer (2) is attached on the truck (1) by reading of this data by the central of the sensor (21).

Another great advantage of this proposal is that the reference device (20) can be easily attached to the king pin (5) and the central sensor (21) also simple to be fixed on the fifth wheel (3). Even if there is a need to place a reference device (20) on the semi-trailer (2), it is easy to apply, without structural changes in the parts and very interesting for application in tracking systems in vehicles already in circulation. As it is a contact-less system between the central sensor (21) and the reference device (20), it allows the constant engagement and disengagement of the vehicle without interference and mechanical wears.

In general, both solutions are a three-dimensional king pin's (5) monitoring, reveals systems that king pin (5) has six degrees of mechanical freedom for movements, moreover by the sensors (6 and 20), is monitored and measure the king pin's (5) movements in all these six degrees of freedom (RZ, RX, RY and TZ, TX, TY). This patent reveals an innovative and disruptive technology compared to the current state of the art which only presents solutions to measure angles, are more complex and have technical restrictions. The solutions now present have industrial applicability, affordable cost and great potential to meet technological needs for safety, automation and dynamic control on articulated vehicles.

The invention claimed is:

1. A "THREE-DIMENSIONAL MONITORING SYSTEM FOR KINGPIN ON FIFTH WHEEL" characterized by a fifth wheel monitoring system for detecting and monitoring six degrees of freedom of movement of a king pin relative to a fifth wheel, including:
   the king pin's translational displacements and clearances (TX, TY, TZ) on X, Y, and Z axes only relative to the fifth wheel; and
   the king pin's rotational movements (RX, RY, RZ) on the X, Y, and Z axes only relative to the fifth wheel;
wherein the fifth wheel monitoring system comprises two devices for a comparative reading and measurement:
   an electronic measurement device only present and fixed on the fifth wheel, and
   a measured reference device only attached to the king pin.

2. The "THREE-DIMENSIONAL MONITORING SYSTEM FOR KINGPIN ON FIFTH WHEEL" according to claim 1, wherein in the fifth wheel monitoring system:
   the electronic measurement device includes a fifth wheel electronic central that contains accelerometers and gyroscopic sensors; and
   the measured reference device is connected to the fifth wheel electronic central, and includes an electromagnet device that contains the set of sensors that has-another arrangement of accelerometers and gyroscopes inside, for being coupled to the king pin.

3. The "THREE-DIMENSIONAL MONITORING SYSTEM FOR KINGPIN ON FIFTH WHEEL" according to claim 2, wherein the fifth wheel electronic central is configured to monitor the fifth wheel in hitched and pre-disengagement conditions by monitoring a position and movements of a locking bar mechanism on the fifth wheel; the fifth wheel electronic central being configured to control an electrical supply of the electromagnet device:
   in the hitched condition, the fifth wheel electronic central being configured to electrify the electromagnet device that couples to the king pin by magnetic attraction and follows all movements of the king pin, and for the set of sensors including the accelerometers and gyroscopes present inside and fixed on the electromagnet device to detect and monitor all movements and accelerations of the king pin on the X, Y, and Z axes;
   in the pre-disengagement condition, the fifth wheel electronic central is configured to cut off the electrical supply of the electromagnet device to disconnect the electromagnet device from the king pin.

4. The "THREE-DIMENSIONAL MONITORING SYSTEM FOR KINGPIN ON FIFTH WHEEL" according to claim 2, wherein the fifth wheel monitoring system is configured to measure absolute values from the fifth wheel of the king pin's relative movements, including rotation angles on the X, Y, and Z axes, and the translational clearances on the X, Y, and Z axes, by comparing data from the gyroscope and the accelerometer present inside the fifth wheel electronic central to the data from the sensors fixed on the electromagnetic device that has the other gyroscope and accelerometers inside and is coupled to the king pin.

5. The "THREE-DIMENSIONAL MONITORING SYSTEM FOR KINGPIN ON FIFTH WHEEL" according to claim 1, wherein in the fifth wheel monitoring system:
   the electronic measurement device is a magnetometer electronic central present and fixed only on a fifth wheel bottom, that contains magnetometer sensors inside that provide monitoring and measurement of magnetic field variation across the three axes;
   the measured reference device further comprises an independent measured reference device attached to the king pin that contains a permanent magnet.

6. The "THREE-DIMENSIONAL MONITORING SYSTEM FOR KINGPIN ON FIFTH WHEEL" according to claim 5, comprising a system that measures absolute values from the fifth wheel, of the king pin's relative movements, including rotation angles on the X, Y, and Z axes, and the translational clearances on the X, Y, and Z axes, wherein measurement of the king pin's relative movements are made from the magnetometer electronic central presented on the fifth wheel bottom for monitoring the position on the three axes of the permanent magnet attached to the king pin, and from these three-dimensional position variations of the permanent magnet attached on the king pin, the system measures the king pin rotation angles and translational clearances relative to the fifth wheel position on the X, Y, and Z axes.

7. The "THREE-DIMENSIONAL MONITORING SYSTEM FOR KINGPIN ON FIFTH WHEEL" according to claim 5, further comprising a system for monitoring an engagement/disengagement condition of the king pin from a sensor present only in the fifth wheel, wherein the magnetometer electronic central is configured to measure a magnetic field intensity, wherein:
   a hitch engagement condition is recognized by a higher magnetic field intensity measurement from proximity of the permanent magnet attached on the king pin to the magnetometer electronic central present on the fifth wheel bottom;
   and an unhitched disengagement condition is verified by a low magnetic field intensity approaching zero, as movement of the king pin increases a distance between the permanent magnet attached on the king pin to the magnetometer electronic central present on the fifth wheel bottom.

8. The "THREE-DIMENSIONAL MONITORING SYSTEM FOR KINGPIN ON FIFTH WHEEL" according to claim 5, wherein the system is configured to indicate which trailer is attached to a truck on which the fifth wheel is mounted by verification made in the fifth wheel, which is accomplished by two devices:

the magnetometer electronic central positioned on the truck's fifth wheel, which includes a TAG reader;

and a coded TAG that is attached to the trailer's king pin; wherein in the condition that the king pin is hitched on the fifth wheel, the TAG reader on the magnetometer electronic central identifies the trailer's identification code by reading the coded TAG attached to trailer's king pin.

\* \* \* \* \*